(12) United States Patent
O'Neill

(10) Patent No.: US 6,926,244 B1
(45) Date of Patent: Aug. 9, 2005

(54) SLIM PROFILE APPLIANCE MOUNT

(76) Inventor: Edward L. O'Neill, Lucasey Manufacturing Company 2744 E. 11th St., Oakland, CA (US) 94601

( * ) Notice: Subject to any disclaimer, the term of this patent is extended or adjusted under 35 U.S.C. 154(b) by 0 days.

(21) Appl. No.: 10/607,849

(22) Filed: Jun. 27, 2003

(51) Int. Cl.$^7$ .............................................. A47B 91/00
(52) U.S. Cl. ................. 248/346.01; 248/551; 248/678; 248/680; 248/681; 248/500; 70/52
(58) Field of Search ........................... 248/346.01, 551, 248/678, 680, 676, 553, 552, 681, 500, 509, 248/510, 506, 346.06; 70/62

(56) References Cited

U.S. PATENT DOCUMENTS

| | | | |
|---|---|---|---|
| 3,993,278 A | * | 11/1976 | Race ........................... 248/551 |
| 4,738,428 A | * | 4/1988 | Themistos et al. .......... 248/551 |
| 4,878,645 A | | 11/1989 | O'Neill |
| 4,973,023 A | | 11/1990 | O'Neill |
| D320,928 S | | 10/1991 | Boscacci et al. |
| 5,169,114 A | | 12/1992 | O'Neill |
| 5,209,445 A | * | 5/1993 | Bergetz ....................... 248/551 |
| 5,697,233 A | * | 12/1997 | Albert et al. .................. 70/58 |
| 6,102,348 A | | 8/2000 | O'Neill |
| 6,740,851 B2 | * | 5/2004 | Woodlief et al. ........... 219/421 |

OTHER PUBLICATIONS

Lucasey 5100 Series Furniture Swivel Mounts Installation Instructions (Aug. 1993).

* cited by examiner

*Primary Examiner*—Kimberly Wood
(74) *Attorney, Agent, or Firm*—Niro, Scavone, Haller & Niro

(57) ABSTRACT

An apparatus for securing an appliance to a support surface comprises a first base and a second base. The first and second bases are sized to allow the first base to be nestable within the second base. The first base is movable between first and second positions with respect to said second base. In the first position, the bases are in an unlocked position and an interlocking member is disengaged; and in the second position, the interlocking member is engaged to interlock the bases.

3 Claims, 1 Drawing Sheet

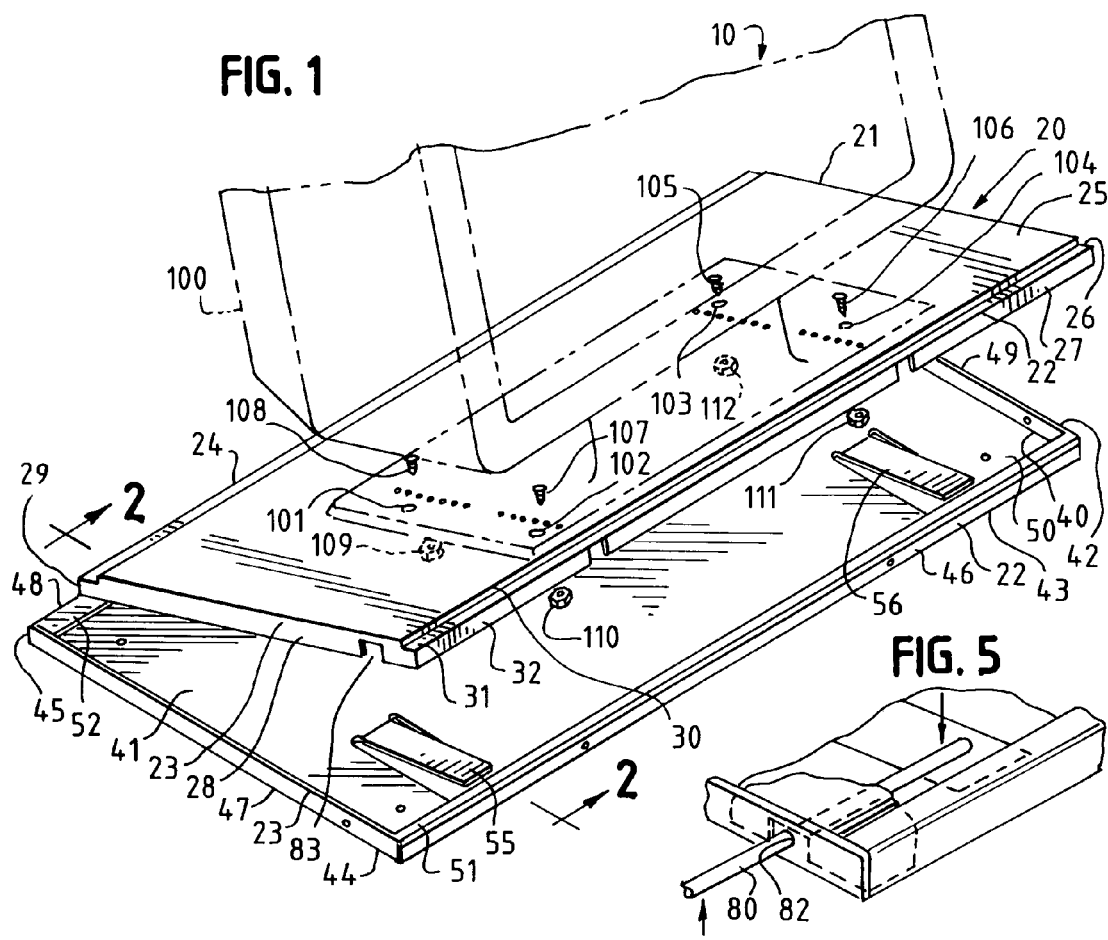
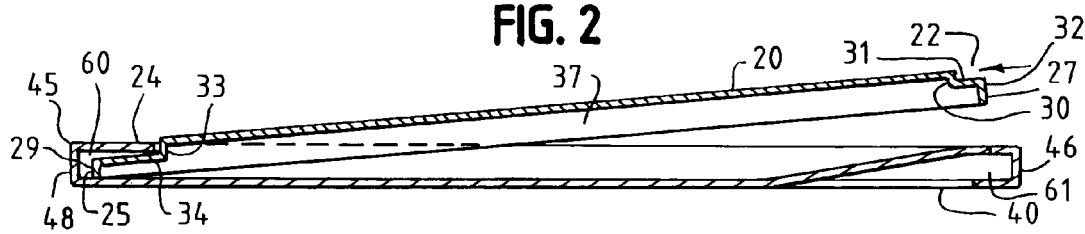
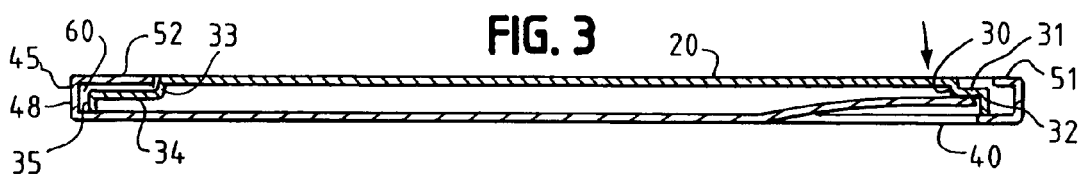
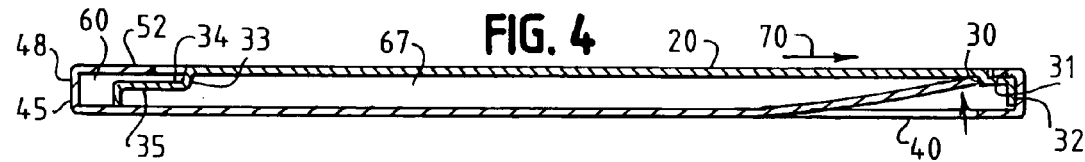
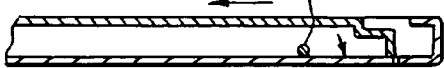

SLIM PROFILE APPLIANCE MOUNT

BACKGROUND OF THE INVENTION

The present invention relates to a device and method for securely mounting an appliance to a support surface. More specifically, the present invention concerns a first base that releasably interlocks with a second base. One of the bases is mounted to a support surface while an appliance is attached to the other base.

SUMMARY OF THE INVENTION

When designing devices for securing an appliance, such as a television, monitor, radio and the like, competing design criteria often exist. For example, the mounting apparatus needs to be able to securely hold the appliance while still providing an aesthetically pleasing appearance. Another important consideration is that the device should also be economical to produce.

The present invention satisfies these competing needs by providing a first base that releasably interlocks with a second base. The first base nests within the second base so as to provide a slim appearance while still retaining sufficient strength to securely hold the appliance.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

FIG. 1 shows a perspective view of one embodiment of the present invention;

FIG. 2 shows a sectional view taken along line 2—2 and which illustrates how one end of the first base nests within a receiving end located on a second base;

FIG. 3 is a sectional view illustrating how an opposing end on the first base is positioned to be nested within a second receiving end on the second base;

FIG. 4 is a sectional view illustrating how an opposing end on the first base nests within a second receiving end on the second base;

FIG. 5 is a perspective view illustrating how an insertable rod may be used with the present invention; and FIGS. 6 and 7 are sectional views illustrating how a rod may be used to unlock the bases.

DESCRIPTION OF THE PREFERRED EMBODIMENTS

Set forth below is a description of what is currently believed to be the preferred embodiments or best examples of the invention claimed. Future and present alternatives and modifications to the preferred embodiments are contemplated. Any alternates or modifications in which insubstantial changes in function, purpose, structure or result are intended to be covered by the claims of this patent.

The present invention concerns an appliance mounting apparatus 10 which includes, as shown in FIGS. 1–4, a first base 20 and a second base 40. As shown, first base 20 has a generally planar section 25 which has opposingly located ends 21–23 from which end walls 26–29 may depend.

As shown in FIGS. 2–4, ends 22 and 24 are stepped in configuration. Stepping end 22 results in a first stepped surface 30 which may be vertical in orientation, a second stepped surface 31 which may be generally horizontal in orientation and a third stepped surface 32 which may be vertical in orientation. Stepping end 24 also results in a first stepped surface 33 which may be vertical in orientation, a second stepped surface 34 which may be generally horizontal in orientation and a third stepped surface 35 which may be vertical in orientation.

Base 20 is also configured to create an internal cavity 37 which is defined by planar section 25 and end walls 26–29. First base 20 is also the sized to nest within second base 40 as will be described in further detail below.

Base 40 is comprised of a generally planar section 41 having opposing ends 42–45. Base 40 also includes end walls 46–49 which along with planar section 41 create an internal cavity 50.

As shown in FIGS. 1–4, end wall 48 of end 46 includes a lip 51 and end wall 46 of end 45 includes a lip 52. Base 40 further includes tabs or tongues 55 and 56 which project into cavity 41.

In use, as shown in FIG. 1, an appliance 100 maybe mounted to base 20 through the use of apertures 101–104 and fasteners 105–112 and in other ways known to those of skill in the art. Base 40 may be mounted to a support surface through the use of fasteners, adhesive, and in other ways known to those of skill in the art.

Next, stepped end 29 is inserted into channel or cavity 60 formed by lipped end 45 on base 40. As shown in FIGS. 2–4, stepped end 29 is slid fully into channel 60. This allows end 22 to become fully seated within base 40. It also results in section 31 pressing down against tabs 55 and 56.

Base 20 is then slid towards end 22 as shown by arrow 70. This results in the tabs sliding along section 31 until the section ends. This then allows the tabs to spring upwardly so as to engage the juncture of sections 30 and 31. This allows section 31 to then act as a stop which prevents any further movement of base 20. At this point, the two bases are interlocked together since lip 52 will also act as a stop that coacts with section 35 to prevent based 20 from be lifted out of base 40. Also acting as a stop is lip 51 which coacts with section 31 to prevent end 22 of base 20 from being lifted out of base 40.

Thus, as shown, base 20 is positionable between a first position in which the stepped portion of end 24 is first inserted into channel 60 of base 40 and a second position in which stepped end 22 is then inserted into channel or cavity 61 of base 40. This results in the two bases being interlocked together since lips 51 and 52 act as stops that prevent base 20 from being lifted out of channels 60 and 61 of base 40.

Moreover, when the bases are interlocked an internal cavity or protectable chamber 67 is formed which is generally inaccessible from the outside of the device. This prevents tampering with the tabs which results in an inability to unlock or separate the two bases. This results in the appliance being securely affixed to the support surface. FIGS. 5–7 illustrate a way to unlock the bases. To do this, a rod 80 is inserted into aperture 82 on base 40 which is aligned with notch 83 on base 20. Rod 80 is used to urge tabs 55–56 out of engagement with base 20 as shown in FIGS. 6 and 7. This, in turn, allows base 20 to be slid toward end 45 of base 40. Once this is done, end 22 clears lip 51 which allows the end to be lifted out of base 40. Once this is done, end 29 is easily slid out of base 40.

It should be understood that various changes and modifications to the preferred embodiment described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. An apparatus for securing an appliance to a support surface comprising:
   a first base having a substantially planar section and opposingly located stepped ends;
   a second base having a substantially planar section and opposingly located lipped ends each of which forms a channel;
   at least one moveable tab depending from said second base;
   said first and second bases sized to allow said first base to be nestable within said second base and movable between first and second positions with respect to said second base;
   one of said stepped ends sized to be insertable into one of said channels so as to permit said first base to be placed into said first position;
   in said first position, the other stepped end of said first base engaging said moveable tab;
   said first base slideable with respect to said second base to permit said first base to be positioned into said second position with respect to said second base;
   in said second position, said moveable tab is positioned to abut a portion of said stepped portion of said first base to interlock said bases; and
   a rod sized to fit into an opening whereby said rod may engage said at least one moveable tab so as to unlock said bases.

2. The apparatus of claim 1 wherein said lipped ends of said second base act as stops which prevent said first base from being removed from said second base when said first base is in said second position.

3. The apparatus of claim 1 wherein said at least one moveable tab is located in a protected chamber formed when said bases are interlocked.

* * * * *